United States Patent [19]

Imahori et al.

[11] 4,057,539
[45] Nov. 8, 1977

[54] AZO COMPOUNDS CONTAINING A NAPHTHALIC IMIDE COUPLER

[75] Inventors: Seiichi Imahori, Komae; Masaharu Kaneko; Yoshiaki Kato, both of Yokohama, all of Japan

[73] Assignee: Mitsubishi Chemical Industries Ltd., Tokyo, Japan

[21] Appl. No.: 555,726

[22] Filed: Mar. 6, 1975

Related U.S. Application Data

[63] Continuation-in-part of Ser. No. 312,104, Dec. 4, 1972, abandoned.

[30] Foreign Application Priority Data

Dec. 3, 1971 Japan .................................. 46-97730

[51] Int. Cl.$^2$ ............................................ C09B 29/36
[52] U.S. Cl. ...................................... 260/155; 260/152; 260/155; 260/281 N; 260/295 T; 260/281 Q; 544/98
[58] Field of Search ........................ 260/152, 156, 155

[56] References Cited

U.S. PATENT DOCUMENTS

| 2,961,438 | 11/1960 | Fuchs et al. | ........................ 260/152 |
| 3,462,408 | 2/1969 | Hoffmann et al. | ............. 260/152 X |

FOREIGN PATENT DOCUMENTS

| 2,258,545 | 6/1973 | Germany | ............................ 260/152 |

*Primary Examiner*—Charles F. Warren
*Attorney, Agent, or Firm*—Oblon, Fisher, Spivak, McClelland & Maier

[57] ABSTRACT

An azo dye having the formula (1):

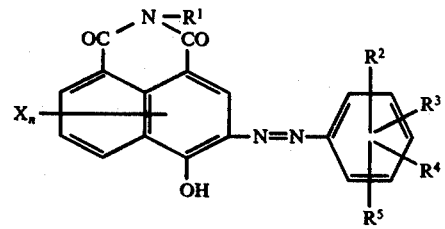

wherein $R^1$ represents hydrogen, methyl, ethyl, propyl, butyl, pentyl, hexyl, hydroxyalkyl, alkoxyalkyl, alkoxycarbonylalkyl, acyloxyalkyl, acylalkyl, hydroxyalkylaminoalkyl, cyanoalkyl, aminoalkyl, N,N-dialkylaminoalkyl, alkylaminoalkyl, chloroalkyl, bromoalkyl, carboxyalkyl, morpholinoalkyl, cyclohexyl, phenethyl, benzyl, phenyl, chlorophenyl, methoxyphenyl, nitrophenyl, tolyl, xylyl, dialkylaminophenyl and alkyl containing an ammonium group wherein the ammonium nitrogen is quaternized by alkyl groups or by an amino group with alkyl groups, or wherein the ammonium nitrogen atom is the heterocyclic nitrogen atom of a morpholine ring or a pyridine ring, wherein $R^2$, $R^3$, $R^4$ and $R^5$ represent hydrogen, chlorine, bromine, nitro, cyano, carboxyl, methyl, ethyl, propyl, butyl, trifluoromethyl, $\beta$-hydroxyethyl, phenyl, alkoxy, chlorophenoxy, alkoxycarbonyl, acetyl, benzoyl, acetylamino, benzoylamino, alkylsulfonyl, phenylsulfonyl, dimethylaminosulfonyl, dibutylaminosulfonyl, diethylaminosulfonyl, dialkylcarbamoyl, and aminocarbonyl under conditions such that at least one of $R^2$, $R^3$, $R^4$ and $R^5$ is hydrogen, wherein the terms "alkyl" and "alkoxy" for the groups of $R^1$ have from one to six carbon atoms and wherein the terms "alkyl" and "alkoxy" for the groups $R^2$, $R^3$, $R^4$ and $R^5$ have from one to four carbon atoms; X represents hydrogen, chlorine, bromine, iodine and nitro and $n$ represents 0 or an integer from 1 to 3, which is useful for dyeing synthetic fibers, synthetic-semi-synthetic fibers and blends thereof with natural fibers.

16 Claims, No Drawings

AZO COMPOUNDS CONTAINING A NAPHTHALIC IMIDE COUPLER

CROSS-REFERENCE TO RELATED APPLICATIONS

This application is a continuation-in-part of application Ser. No. 312,104, filed Dec. 4, 1972 now abandoned.

BACKGROUND OF THE INVENTION

1. Field of the Invention

This invention relates to an azo dye. It also relates to a process for preparing the azo dye and a process for dyeing fibers with the azo dye.

2. Description of the Prior Art

Other azo dyes are known in the prior art which possess fastness to wet processing, ironing, thermofixation and light. One such class of azo dyes is disclosed by the Fuchs, et al reference, U.S. Pat. No. 2,961,438, which shows azo dyes having the formula

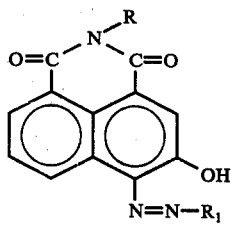

However, a need still continues to exist for azo dyes which have superior light fastness capable of satisfactorily meeting minimum industrial standards.

SUMMARY OF THE INVENTION

It is an object of this invention to provide an azo dye which has a high fastness, particularly a high light fastness.

It is another object of this invention to provide an industrially advantageous process for preparing an azo dye.

It is still another object of this invention to provide a process for dyeing fibers with an azo dye.

Briefly, these objects and other objects of this invention, as will hereinafter become apparent, are achieved with an azo dye having the formula (1):

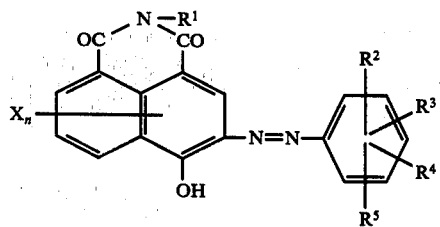

wherein $R^1$ represents hydrogen, methyl, ethyl, propyl, butyl, pentyl, hexyl, hydroxyalkyl, alkoxyalkyl, alkoxycarbonylalkyl, acyloxyalkyl, acylalkyl, hydroxyalkylaminoalkyl, cyanoalkyl, aminoalkyl, N,N-dialkylaminoalkyl, alkylaminoalkyl, chloroalkyl, bromoalkyl, carboxyalkyl, morpholinoalkyl, cyclohexyl, phenethyl, benzyl, phenyl, chlorophenyl, methoxyphenyl, nitrophenyl, tolyl, xylyl, dialkylaminophenyl and alkyl containing an ammonium group wherein the ammonium nitrogen is quaternized by alkyl groups or by an amino group with alkyl groups, or wherein the ammonium nitrogen atom is the heterocyclic nitrogen atom of a morpholine ring or a pyridine ring, wherein $R^2$, $R^3$, $R^4$ and $R^5$ represent hydrogen, chlorine, bromine, nitro, cyano, carboxyl, methyl, ethyl, propyl, butyl, trifluoromethyl, β-hydroxyethyl, phenyl, alkoxy, chlorophenoxy, alkoxycarbonyl, acetyl, benzoyl, acetylamino, benzoylamino, alkylsulfonyl, phenylsulfonyl, dimethylaminosulfonyl, dibutylaminosulfonyl, diethylaminosulfonyl, dialkylcarbamoyl, and aminocarbonyl under conditions such that at least one of $R^2$, $R^3$, $R^4$ and $R^5$ is hydrogen, wherein the terms "alkyl" and "alkoxy" for the group of $R^1$ have from one to six carbon atoms and wherein the terms "alkyl" and "alkoxy" for the groups $R^2$, $R^3$, $R^4$ and $R^5$ have from one to four carbon atoms; X represents hydrogen, chlorine, bromine, iodine and nitro and $n$ represents 0 or an integer from 1 to 3.

The azo dye of this invention can be prepared by coupling a 4-hydroxy naphthalic imide having the formula (II):

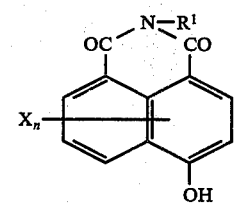

wherein $R^1$, X and $n$ have the same definitions as described in formula (I) with a diazonium salt of an aromatic amine having the formula (III):

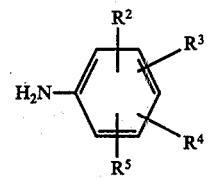

wherein $R^2$, $R^3$, $R^4$ and $R^5$ have the same definitions as described in formula (I).

DESCRIPTION OF THE PREFERRED EMBODIMENTS

In the 4-hydroxy naphthalic imide coupler having formula (II), $R^1$ can include a hydrogen atom, unsubstituted alkyl groups, such as methyl, ethyl, straight chain and branched chain groups such as propyl, butyl, pentyl, hexyl groups; substituted alkyl groups such as hydroxyalkyl, alkoxyalkyl, alkoxycarbonylalkyl, acyloxyalkyl, cyanoalkyl, aminoalkyl, N,N-dialkylaminoalkyl, alkylaminoalkyl, haloalkyl, carboxyalkyl, and morpholinoalkyl groups, alkyl groups containing an ammonium group wherein the ammonium nitrogen is quaternized by alkyl groups or by an amino group with alkyl groups; or wherein the ammonium nitrogen atom is the heterocyclic nitrogen atom of a morpholine ring or a pyridine ring; cycloalkyl groups such as cyclohexyl; aralkyl groups such as benzyl and phenethyl; and aryl groups such as phenyl, chlorophenyl, methoxyphenyl, nitrophenyl, tolyl, xylyl and alkylaminophenyl.

In the various groups which define $R^1$, those groups which contain an alkyl substituent or an alkoxy substituent contain from one to six carbon atoms. Also, the term "acyl" of acyloxyalkyl includes such groups as formyl, acetyl, propionyl, butyroyl, benzoyl, toluyl and phenylacetyl.

In the coupler molecule (II), X can be a halogen such as chlorine, bromine and iodine, or a nitro group, all of which are substituted mainly at the 5- or 6-position. The value of $n$ in $X_n$ varies from 0 to 3.

The 4-hydroxynaphthalic imides can be prepared by the hydrolysis of a corresponding sulfonaphthalic imide having the formula (IV):

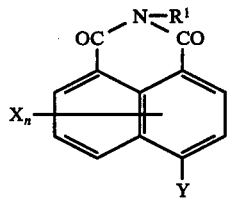

wherein $R^1$, X and $n$ are the same as defined in formula (II) and Y represents the sulfonic acid group and sulfonate groups, preferably in the presence of alkali.

In the aromatic amines having formula (III), $R^2$, $R^3$, $R^4$ and $R^5$ include the hydrogen atom, nitro group, cyano group, carboxyl group; halogen atoms such as chlorine, bromine; substituted and unsubstituted alkyl groups such as methyl, ethyl, trifluoromethyl, and β-hydroxyethyl; aryl groups such as phenyl; alkoxyl groups such as methoxy and ethoxy; aryloxy groups such as phenoxy; alkoxycarbonyl groups such as methoxycarbonyl, ethoxycarbonyl and butoxycarbonyl; acyl groups such as acetyl and benzoyl; acylamino groups such as acetylamino and benzoylamino; alkylsulfonyl groups such as methylsulfonyl and ethylsulfonyl; arylsulfonyl groups such as phenylsulfonyl; aminosulfonyl groups such as methylamino sulfonyl, butylaminosulfonyl and diethylaminosulfonyl; and aminocarbonyl groups such as methylaminocarbonyl, and diethylaminocarbonyl. These aromatic amines can be the amines disclosed in Japanese Patent Publication No. 36237/1970.

In the various groups which define $R^2 - R^5$, those groups which contain an alkyl substituent or an alkoxy substituent contain from one to four carbon atoms.

The diazonium salts of the aromatic amines can be prepared by diazotizing a mineral acid salt solution of an aromatic amine with an aqueous solution of sodium nitrite at temperatures below 5° C. The diazonium salt of an aromatic amine can also be prepared by dissolving sodium nitrite in sulfuric acid at about 70° C. and then cooling the mixture below 5° C. and then adding this solution to a sulfuric acid solution or a phosphoric acid solution of the aromatic amine.

In accordance with this invention, azo dyes having the formula (I) can be prepared by coupling a 4-hydroxynaphthalic imide derivative having formula (II) with the diazonium salt of an aromatic amine having the formula (III). The coupling reaction is preferably conducted in an alkaline medium.

Suitable alkaline compounds include sodium hydroxide, sodium carbonate, sodium bicarbonate, and the like. The coupling reaction can also be conducted by adding a water miscible organic solvent such as an alcohol, acetic acid, or dioxane to the medium in a neutral or a weakly acidic condition. The coupling reaction can be conducted by admixing the aromatic amine compound and the 4-hydroxynaphthalic imide compound, preferably on a 1 : 1 mole basis. However, an excess of either compound can be used. The coupling reaction is conducted at a temperature lower than the decomposition temperature of the diazonium salt, preferably from 0° to 30° C.

The azo dyes having formula (I), wherein $n$ is at least one, can also be prepared by the following process.

The azo dyes having the formula (V):

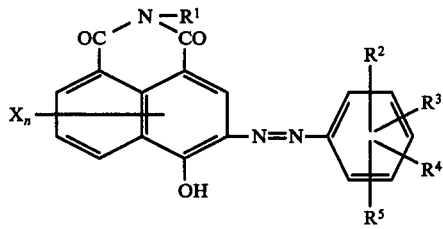

wherein $R^1$, $R^2$, $R^3$, $R^4$ and $R^5$ are the same as defined in formula (I), can be halogenated or nitrated in a solvent such as dichlorobenzene. concentrated sulfuric acid, and the like by conventional processes. Halogenation is not always required and, when it is, it can be conducted by reacting the dye with a halogenating agent such as chlorine, bromine, sulfuryl chloride or the like in molar amounts ranging from 1 – 5 times the number of moles of dye. Preferably, a small excess of the halogenating agent is used in a solvent which is inert to the halogen under the reaction conditions, such as concentrated sulfuric acid, carbon tetrachloride, nitrobenzene, chlorobenzene, o-dichlorobenzene, acetic acid and the like at 20° – 200° C. The choice of solvent is further restricted by the type of halogenating agent and other reaction conditions. Nitration is not always required and can be conducted by reacting concentrated nitric acid, a mixture of nitric acid and sulfuric acid or fuming nitric acid with the dye at 20° – 100° C. If necessary, nitrobenzene, o-dichlorobenzene, or the like may be added to the nitrating medium. The azo dyes containing halogen or nitro groups as indicated by the abbreviation $X_n$ have a high sublimation fastness.

The azo dyes having formula (I) prepared in accordance with this invention are useful dyes for synthetic fibers, especially polyester fibers, and impart clear colors having excellent fastness to synthetic fibers manufactured from synthetic and semi-synthetic polymers such as polyester fibers, polyacrylonitrile fibers, polyamide fibers, polyurethane fibers, triacetate fibers, diacetate fibers and the like, and blends thereof with natural fibers such as cotton, silk and wool.

The azo dyes except those which contain tertiary ammonium groups are water insoluble, and are used in dip dyeing and printing processes by dispersing the dye in a dye bath or a printing paste in the presence of a dispersing agent such as a condensate of naphthenesulfonic acid and formaldehyde, higher alcohol sulfates, and higher alkylbenzenesulfonates. Other suitable dyeing techniques for the range of fibers mentioned include high temperature dyeing, carrier dyeing and thermosol dyeing. Preferably, acidic compounds such as formic acid, acetic acid, phosphoric acid or ammonium sulfate are added to the dye medium.

The azo dyes (I) containing teritiary ammonium groups are useful for dyeing fibers, especially polyacrylonitrile fibers, which have a high color fastness.

The azo dyes (I) of this invention can be formulated with other dyes which can be similar or dissimilar to the subject dye. In many cases, the properties of the azo dye (I) are improved by a synergistic effect which occurs when an azo dye is combined with another dye.

Having generally described the invention, a more complete understanding can be obtained by reference to certain specific Examples, which are provided herein for purposes of illustration only and are not intended to be limiting. In the following Examples, λmax designates the maximum absorption wave length of the dye measured in ethanol.

EXAMPLE 1

A solution of a diazonium salt prepared by diazotizing 9.3 g. of aniline, was added dropwise to a solution of 22.7 g. of 4-hydroxynaphthalic methylimide, 4 g. of sodium hydroxide, 10.6 g. of sodium carbonate in 300 ml. of water at 0° – 5° C. After coupling, the precipitated crystals were filtered, dispersed in dilute hydrochloric acid, filtered, washed with water and dried to yield 30 g. of an azo dye having the formula:

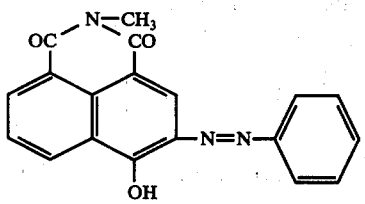

(λmax : 496 mμ)

A 0.5 g. amount of the azo dye was dispersed in a solution of 1 g. of the condensation product of naphthalene sulfonic acid and formaldehyde and 2 g. of a sodium salt of a higher fatty alcohol sulfate in 3 l. of water to prepare a dye bath. A 100 g. quantity of a polyester fiber was dipped in the bath and dyed at 130° C. for 60 minutes. The fiber was washed with soap and with water, and dried to yield a clear, scarlet colored polyester fiber, which had a high light fastness (4 – 5 grade in JIS L 1044–1959) and a high sublimation fastness.

EXAMPLE 2

A solution of the diazonium salt prepared by diazotizing 18.3 g. of 2,4-dinitroaniline with nitrosyl sulfuric acid was added dropwise to a solution of 22.7 g. of 4-hydroxynaphthalic methylimide and 4 g. of sodium hydroxide in 300 ml. of water at 0° – 5° C. After stirring the mixture for 1 hour, it was neutralized by adding sodium hydroxide and sodium acetate. After coupling, the precipitated crystals were filtered, dispersed in dilute hydrochloric acid, filtered, washed with water and dried to yield 32 g. of an azo dye having the following formula:

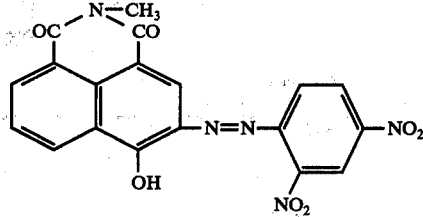

(λmax : 501 mμ)

A polyester fiber treated with the azo had a bluish-red color, and a high color fastness.

EXAMPLE 3

In accordance with the processes of Examples 1 and 2, diazonium salts prepared from many aromatic amines having the aromatic residues labeled as

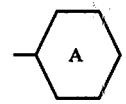

in Table I were reacted with alkali solutions each containing a 4-hydroxynaphthalic imide coupler having the formula:

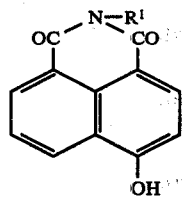

wherein $R^1$ is selected from the group listed under "Coupler" in Table I, to prepare a host of azo dyes. The color of fibers treated with each dye is also indicated in Table I.

TABLE I

| Example | Coupler $R^1$ | diazonium salt—A | λ max | Color of polyester fiber dyed |
|---|---|---|---|---|
| 3-1 | —H | ⟨phenyl⟩ | 495 | scarlet |
| 3-2 | —H | ⟨phenyl-CH₃⟩ | 496 | clear orange red |
| 3-3 | —CH₃ | ⟨phenyl-NO₂⟩ | 502 | bluish red |

TABLE I-continued
| Example | Coupler R¹ | diazonium salt—A | λ max | Color of polyester fiber dyed |
|---|---|---|---|---|
| 3-4 | —CH₃ | 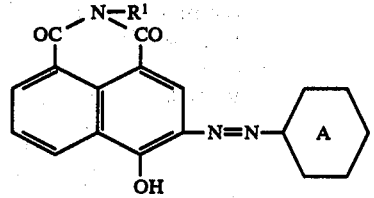 | 495 | scarlet |
| 3-5 | —CH₃ | 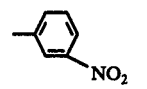 | 494 | " |
| 3-6 | —CH₃ | 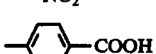 | 499 | red |
| 3-7 | —CH₃ | 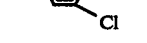 | 495 | clear orange red |
| 3-8 | —CH₃ | 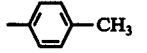 | 499 | red |
| 3-9 | —CH₃ | 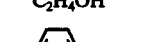 | 496 | clear orange red |
| 3-10 | —CH₃ | 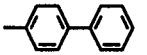 | 498 | red |
| 3-11 | —CH₃ | 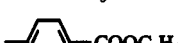 | 495 | scarlet |
| 3-12 | —CH₃ | 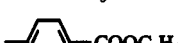 | 512 | bordeaux |
| 3-13 | —CH₃ |  | 510 | pink |
| 3-14 | —CH₃ | —⌬—COOC₂H₅ | 499 | red |
| 3-15 | —CH₃ | —⌬—COCH₃ | 498 | bluish red |
| 3-16 | —CH₃ | —⌬—COOC₄H₉[n] | 498 | red |
| 3-17 | —CH₃ | —⌬—CO—⌬ | 499 | " |
| 3-18 | —CH₃ |  | 495 | scarlet |
| 3-19 | —CH₃ | —⌬—NHCOCH₃ | 499 | red |
| 3-20 | —CH₃ | —⌬—NHCO—⌬ | 499 | " |
| 3-21 | —CH₄ | —⌬—SO₂CH₃ | 498 | " |
| 3-22 | —CH₃ | —⌬—SO₂C₂H₅ | 498 | " |
| 3-23 | —CH₃ | 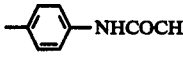 | 495 | scarlet |

TABLE I-continued

[Structure: naphthalimide-azo-A with R¹ on imide N, OH on naphthalene]

| Example | Coupler R¹ | diazonium salt—A | λ max | Color of polyester fiber dyed |
|---|---|---|---|---|
| 3-24 | —CH₃ | –C₆H₄–CONH₂ | 499 | red |
| 3-25 | —CH₃ | –C₆H₄–CON(CH₃)₂ | 499 | " |
| 3-26 | —CH₃ | –C₆H₄–CON(C₂H₅)₂ | 499 | " |
| 3-27 | —CH₃ | 2-CN, 4-NO₂-phenyl | 502 | bluish red |
| 3-28 | —CH₃ | 2-Cl, 4-NO₂-phenyl | 507 | pink |
| 3-29 | —CH₃ | 2-NO₂, 4-Cl-phenyl | 501 | bluish red |
| 3-30 | —CH₃ | 2-CH₃, 4-NO₂-phenyl | 502 | " |
| 3-31 | —CH₃ | 2-OCH₃, 4-NO₂-phenyl | 517 | " |
| 3-32 | —CH₃ | 2-NO₂, 4-OCH₃-phenyl | 525 | reddish violet |
| 3-33 | —CH₃ | 2-CN, 4-CN-phenyl | 515 | bluish red |
| 3-34 | —CH₃ | 2,4-diCl-phenyl | 495 | scarlet |
| 3-35 | —CH₃ | 2-CH₃, 3-Cl-phenyl | 495 | " |
| 3-36 | —CH₃ | 2-Cl, 4-CF₃-phenyl | 494 | " |
| 3-37 | —CH₃ | 2-OCH₃, 4-Cl-phenyl | 506 | pink |
| 3-38 | —CH₃ | 3,5-bis(CF₃)-phenyl | 495 | scarlet |
| 3-39 | —CH₃ | 2-(4-Cl-phenoxy), 4-Cl-phenyl | 499 | red |
| 3-40 | —CH₃ | 2-OCH₃, 4-SO₂N(C₂H₅)₂-phenyl | 495 | scarlet |

TABLE I-continued

[Structure: naphthalimide with N-R¹, azo group -N=N-A, and OH]

| Example | Coupler R¹ | diazonium salt—A | λ max | Color of polyester fiber dyed |
|---|---|---|---|---|
| 3-41 | —CH₃ | 4-OCH₃, 3-methyl-phenyl with SO₂N(C₄H₉)₂ | 496 | " |
| 3-42 | —CH₃ | 2,4-Cl₂, 5-NO₂ phenyl (methyl) | 502 | bluish red |
| 3-43 | —CH₃ | Cl, NO₂, NO₂ substituted phenyl (methyl) | 501 | " |
| 3-44 | —C₂H₅ | 4-NO₂-phenyl | 502 | " |
| 3-45 | —C₂H₅ | 4-Cl-phenyl | 499 | clear scarlet |
| 3-46 | —C₂H₅ | 3-CH₃-phenyl | 496 | orange red |
| 3-47 | —C₂H₅ | 2-OCH₃, 4-NO₂-phenyl | 497 | " |
| 3-48 | —C₂H₅ | 2-COOCH₃-phenyl | 499 | red |
| 3-49 | —C₂H₅ | 3,5-Cl₂, 4-methyl, SO₂N(CH₃)₂ phenyl | 499 | " |
| 3-50 | —C₃H₇(i) | phenyl | 499 | clear scarlet |
| 3-51 | —C₄H₉(n) | phenyl | 499 | " |
| 3-52 | —C₂H₄OH | phenyl | 499 | " |
| 3-53 | —C₂H₄COCH₃ | phenyl | 499 | " |
| 3-54 | —C₂H₄OH | 4-NO₂-phenyl | 502 | bluish red |
| 3-55 | —C₂H₄OH | 2-OCH₃-phenyl | 508 | pink |
| 3-56 | —C₂H₄OC₂H₅ | 4-Cl-phenyl | 500 | orange red |
| 3-57 | —C₂H₄CN | 3-Cl-phenyl | 495 | clear orange red |
| 3-58 | —C₂H₄Cl | phenyl | 499 | scarlet |
| 3-59 | —CH₂COOH | phenyl | 498 | " |

TABLE I-continued

| Example | Coupler R¹ | diazonium salt—A | λ max | Color of polyester fiber dyed |
|---|---|---|---|---|
| 3-60 | —CH₂COOCH₃ | —⟨⟩—NO₂ | 502 | bluish red |
| 3-61 | —C₃H₆OCH₃ | —⟨⟩ | 499 | clear scarlet |
| 3-62 | —C₃H₆OCH₃ | —⟨⟩—CH₃ | 500 | clear orange red |
| 3-63 | —C₃H₆OCH₃ | OCH₃, —⟨⟩—NO₂ | 518 | red |
| 3-64 | —C₃H₆OCH₃ | Cl, —⟨⟩—NO₂ | 502 | bluish red |
| 3-65 | —CH₃ | —⟨⟩—Cl | 499 | clear orange red |
| 3-66 | —CH₃ | —⟨⟩—COOCH₃ | 499 | red |
| 3-67 | —C₂H₅ | —⟨⟩—Cl | 495 | clear orange red |
| 3-68 | —C₂H₅ | —⟨⟩—CN | 496 | scarlet |
| 3-69 | —C₂H₅ | OCH₃, —⟨⟩—NO₂ | 517 | bluish red |
| 3-70 | —C₃H₆OCH₃ | —⟨⟩—CF₃ | 492 | scarlet |
| 3-71 | —C₃H₆OCH₃ | —⟨⟩—Cl | 495 | clear orange red |
| 3-72 | —C₃H₆OCH₃ | —⟨⟩—Cl | 500 | " |
| 3-73 | —C₃H₆OCH₃ | —⟨⟩—CN | 497 | scarlet |
| 3-74 | —C₃H₆OCH₃ | —⟨⟩—COOCH₃ | 499 | red |
| 3-75 | —C₃H₆OCH₃ | —⟨⟩—NO₂ | 502 | bluish red |
| 3-76 | —C₄H₉(n) | —⟨⟩—Cl | 500 | " |
| 3-77 | —C₄H₉(n) | OCH₃, —⟨⟩—NO₂ | 518 | " |
| 3-78 | —C₃H₆OC₃H₇ | —⟨⟩—NO₂ | 502 | " |
| 3-79 | —C₃H₆OCH₃ | CN, —⟨⟩—NO₂ | 502 | " |
| 3-80 | —C₃H₆OCH₃ | CH₃, —⟨⟩—NO₂ | 502 | " |

TABLE I-continued

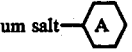

| Example | Coupler R¹ | diazonium salt—A | λ max | Color of polyester fiber dyed |
|---|---|---|---|---|
| 3-81 | —C₃H₆OCH₃ | 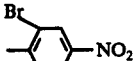 | 503 | " |
| 3-82 | —C₃H₆OCH₃ |  | 502 | " |
| 3-83 | —C₃H₆OCH(CH₃)₂ | 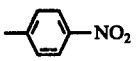 | 502 | " |
| 3-84 | —C₂H₄N(C₂H₅)₂ | 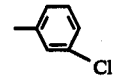 | 495 | orange red |
| 3-85 | —C₃H₆N(CH₃)₂ | 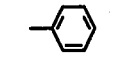 | 499 | clear scarlet |
| 3-86 | —C₃H₆N(CH₃)₂ | 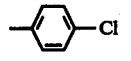 | 500 | clear orange red |
| 3-87 | —CH(CH₂CH₂)₂CH₂ | 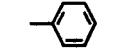 | 499 | clear scalet |
| 3-88 | —CH(CH₂CH₂)₂CH₂ | 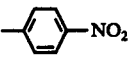 | 502 | red |
| 3-89 | —CH₂CH₂CH₂N(CH₂CH₂)₂O | 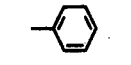 | 499 | scarlet |
| 3-90 | —CH₂—C₆H₅ | 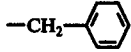 | 500 | " |
| 3-91 | 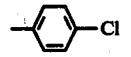 |  | 499 | orange red |
| 3-92 | 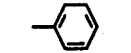 | 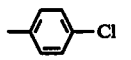 | 502 | bluish red |
| 3-93 | 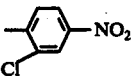 | 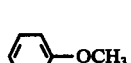 | 500 | orange red |
| 3-94 | 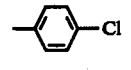 |  | 499 | " |
| 3-95 | 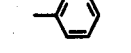 |  | 498 | scarlet |
| 3-96 | 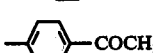 |  | 499 | red |
| 3-97 | —CH₂CH₂—C₆H₅ |  | 500 | scarlet |
| 3-98 | 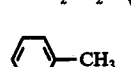 |  | 499 | orange red |
| 3-99 | —C₂H₄NHC₂H₅ |  | 495 | " |
| 3-100 | —C₂H₄NHC₂H₄OH | 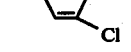 | 499 | " |

TABLE I-continued

| Example | Coupler R¹ | diazonium salt—A | λ max | Color of polyester fiber dyed |
|---|---|---|---|---|
| 3-101 | —C$_2$H$_4$NHCHOH<br>　　　　　｜<br>　　　　　CH$_3$ | 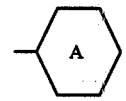 | 502 | bluish red |

EXAMPLE 4

A solution of a diazonium salt prepared by diazotizing 1.28 g. of p-chloroaniline, was added dropwise to a solution of 3.76 g. of a 4-hydroxynaphthalic acid derivative having the formula:

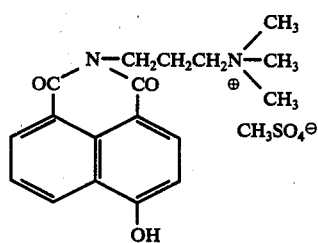

in 80 ml. of water. A 10% sodium carbonate solution was also added dropwise to the solution to maintain neutral or weakly alkaline reaction conditions.

After coupling of the reactants, a dilute hydrochloric acid solution was added to the reaction mixture until weakly acidic. Sodium chloride was added to the solution to aid in the precipitation of the dye. The resulting precipitate was filtered, dispersed in a dilute sodium chloride solution, filtered and dried to yield the red azo dye powder having the following formula:

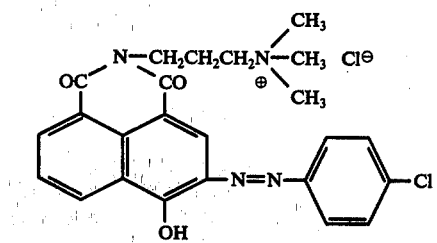

(λ max : 500 mμ)

A 1 g. quantity of the azo dye was dissolved in 3 l. of water, and 3 ml. of a 30% acetic acid solution was added to the solution to prepare a dye bath. A 100 g. quantity of the polyacrylonitrile fiber was dipped in the bath and dyed at 100° C. for 60 minutes to yield a polyacrylonitrile fiber with a clear orange red color and high fastness.

EXAMPLE 5

In accordance with the process of Example 4, diazonium salts of aromatic amines containing aryl groups listed in Table II as

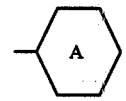

were separately reacted with solutions containing a 4-hydroxynaphthalic derivatives substituted with quarternary ammonium groups as listed in Table II under the heading "R¹."

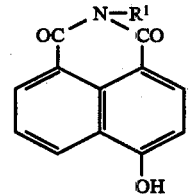

The counter anion of each salt is listed in Table II under "anion." The color of polyacrylonitrile fibers dyed with each azo dye is also shown in Table II.

TABLE II

| Example | Coupler R¹ | anion | A | λ max | Color of polyacrylonitile fiber dyed |
|---|---|---|---|---|---|
| 5-1 | —CH$_2$CH$_2$CH$_2$N$^⊕$(CH$_3$)$_3$ | CH$_3$SO$_4$$^⊖$ | phenyl | 499 | scarlet |

TABLE II-continued

| Example | Coupler R¹ | anion | A | λ max | Color of polyacrylonitrile fiber dyed |
|---|---|---|---|---|---|
| 5-2 | —CH₂CH₂CH₂N⁺(C₂H₅)(CH₃)CH₃ | C₂H₅SO₄⁻ | ―⟨⟩―NO₂ | 498 | " |
| 5-3 | —C₃H₆N⁺(C₂H₅)(CH₂CH₂)₂O morpholinium | C₂C₅SO₄⁻ | ―⟨⟩―Cl | 500 | " |
| 5-4 | —CH₂CH₂N⁺(CH₃)(C₂H₅)(C₂H₅) | CH₃SO₄⁻ | ―⟨⟩―NO₂ | 502 | red |
| 5-5 | —CH₂CH₂-pyridinium | Cl⁻ | ―⟨⟩ with OCH₃ | 508 | " |
| 5-6 | —CH₂CH₂CH₂N⁺(CH₃)₃ | Cl⁻ | ―⟨⟩―NO₂ with OCH₃ | 518 | bluish red |
| 5-7 | —CH₂CH₂CH₂N⁺(CH₃)₃ | Cl⁻ | ―⟨⟩―COCH₃ | 498 | red |
| 5-8 | —CH₂CH₂CH₂N⁺(CH₃)₃ | Cl⁻ | ―⟨⟩―COOCH₃ | 499 | " |
| 5-9 | —CH₂CH₂N⁺(CH₃)(CH₃)(NH₂) | Cl⁻ | OCH₃―⟨⟩―NO₂ | 498 | scarlet |
| 5-10 | —CH₂CH₂-pyridinium | Cl⁻ | ―⟨⟩―CN | 503 | red |

EXAMPLE 6

A solution of a diazonium salt prepared by diazotizing 9.3 g. of aniline, was added dropwise to a solution of 26.2 g. of 4-hydroxy-6-chloronaphthalic methylimide, 4 g. of sodium hydroxide and 10.6 g. of sodium carbonate in 300 ml. of water at 0° – 5° C. After coupling the reactants, the precipitated crystals were filtered, dispersed in dilute hydrochloric acid, filtered, washed with water and dried to yield 32 g. of red crystals having the formula:

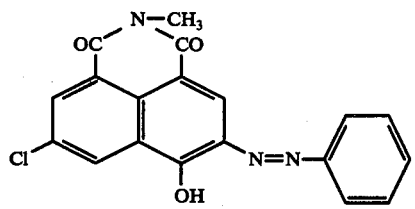

(λmax : 497 mμ)

A 0.5 g. quantity of the resulting compound was dispersed in a solution of 1 g. of the condensation product of naphthalene sulfonic acid and formaldehyde and 2 g. of the sodium salt of a higher fatty alcohol sulfate in 3 l. of water to prepare a dye bath.

A 100 g. amount of the polyester fiber was dipped in the bath and dyed at 130° C. for 60 minutes. The fiber was washed with soap and with water, and dried to yield a polyester fiber with a clear scarlet color, a high light fastness (4 – 5 grade in JISL 1044–1059), and a high sublimation fastness.

EXAMPLE 7

A solution of a diazonium salt prepared by diazotizing 12.8 g. of p-chloroaniline, was added dropwise to a solution of 32.0 g. of 4-hydroxy-6-bromo naphthalic ethylimide, 4 g. of sodium hydroxide and 10.6 g. of sodium carbonate in 300 ml. of water at 0° – 5° C. After coupling the reactants, the precipitated crystals were filtered, dispersed in dilute hydrochloric acid, filtered, washed with water and dried to yield 35 g. of red crystals having the formula:

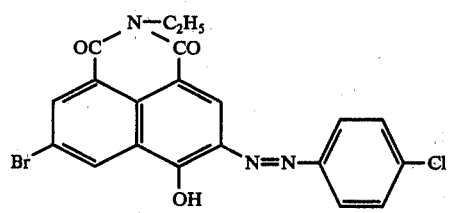

($\lambda$max : 500 m$\mu$)

EXAMPLE 8

A solution of a diazonium salt prepared by diazotizing 13.8 g. of p-nitroaniline, was added dropwise to a solution of 26.1 g. of 4-hydroxy-5-chloronaphthalic methylimide, 4 g. of sodium hydroxide and 10.6 g. of sodium carbonate in 300 ml. of water at 0° – 5° C. After coupling the reactants, the precipitated crystals were filtered, dispersed in dilute hydrochloric acid, filtered, washed with water and dried to yield 36 g. of red crystals having the formula:

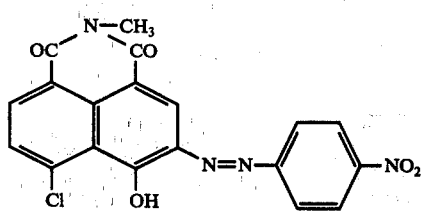

($\lambda$max : 501 m$\mu$)

EXAMPLE 9

A solution of a diazonium salt prepared by diazotizing 13.8 g. of p-nitroaniline, was added dropwise to a solution of 28.5 g. of 4-hydroxynaphthalic-δ-methoxypropylimide, 4 g. of sodium hydroxide and 10.6 g. of sodium carbonate in 300 ml. of water. After coupling the reactants, the precipitated crystals were filtered, washed with water and dried to yield an azo dye. The azo dye was dissolved in o-dichlorobenzene and 12 g. of bromine was added to the solution. The mixture was reacted at 150° C. for 5 hours, followed by diluting the product with methanol. The resulting precipitate was filtered, washed with methanol and dried to yield 32 g. of an azo dye with the following formula:

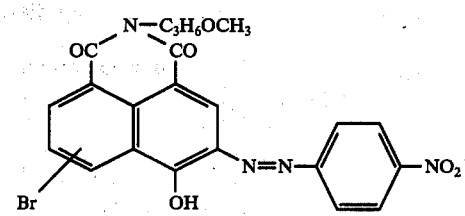

($\lambda$max : 502 m$\mu$)

EXAMPLE 10

An azo dye having the formula:

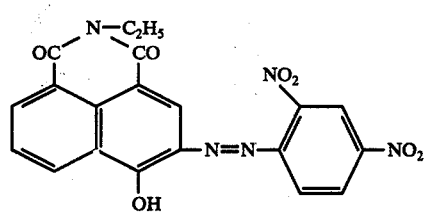

was dissolved in concentrated sulfuric acid and reacted with bromine in the presence of a small amount of iodine to yield red crystals with the following formula:

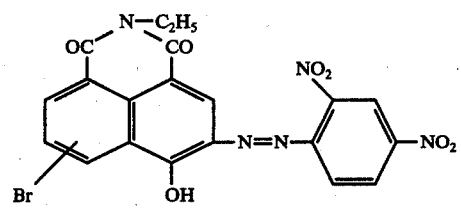

($\lambda$max : 501 m$\mu$)

EXAMPLE 11

An azo dye having the formula:

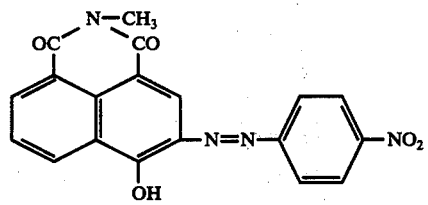

was dissolved in concentrated sulfuric acid and partially reacted with bromine in the presence of a small amount of iodine to yield a mixture of the starting azo dye and the compound with the following formula:

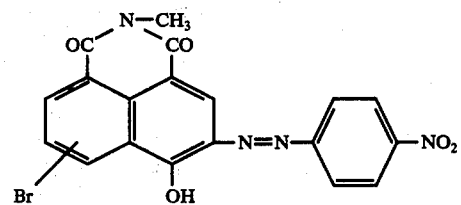

($\lambda$max : 503 m$\mu$)

(m.p. 286° - 290° C. Br content 9.95%)

EXAMPLE 12

A solution of a diazonium salt prepared by diazotizing 12.8 g. of m-chloroaniline, was added dropwise to a solution of 27.2 g. of 4-hydroxy-6-nitronaphthalic methylimide, 4 g. of sodium hydroxide, 10.6 g. of sodium carbonate in 300 ml. of water at 0° - 5° C. After coupling the reactants, the precipitated crystals were filtered, dispersed in dilute hydrochloric acid, filtered, washed with water and dried to yield 35 g. of red crystals with the following formula:

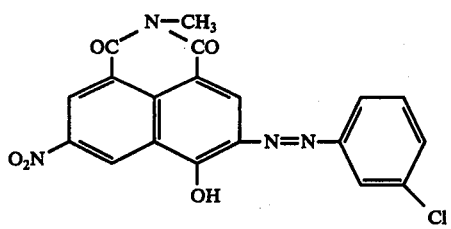

($\lambda$max : 496 m$\mu$)

EXAMPLE 13

In accordance with the process of Example 6, diazonium salts of aromatic amines containing aryl groups labeled as

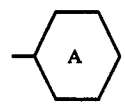

in Table III, were reacted separately with solutions each of which contained a 4-hydroxynaphthalic imide derivative. The imide derivatives were substituted with $R^1$ groups and had $X_n$ substitution as shown in the formula and in Table III.

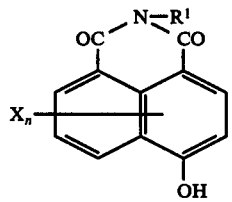

In the Table, the symbols 5-Cl and 6-$NO_2$, respectively, designate Cl substitution in the 5-position and $NO_2$ substitution in the 6-position.

TABLE III

| | Coupler | | diazonium salt | | |
| --- | --- | --- | --- | --- | --- |
| No. | $R^1$ | $X_n$ | A | $\lambda_{max}$ | Color of polyester fiber dyed |
| 13-1 | —H | 6-Cl | phenyl | 497 | scarlet |
| 13-2 | —H | 6-Cl | 3-methylphenyl | 497 | clear orange red |
| 13-3 | —$CH_3$ | 6-$NO_2$ | 4-nitrophenyl | 503 | bluish red |
| 13-4 | —$C_2H_5$ | 6-Br | 3-nitrophenyl | 502 | scarlet |
| 13-5 | —$C_2H_5$ | Br | 2-nitrophenyl | 503 | " |
| 13-6 | —$C_2H_5$ | Br | 4-carboxyphenyl | 500 | red |

TABLE III-continued
| | Coupler | | diazonium salt | | |
|---|---|---|---|---|---|
| No. | R¹ | $X_n$ | A | $\lambda_{max}$ | Color of polyester fiber dyed |
| 13-7 | —C₄H₉(n) | 5-Cl |  (Cl) | 495 | clear orange red |
| 13-8 | —C₄H₉(n) | 6-Cl | 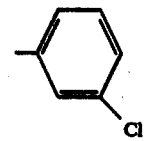 (Br) | 497 | red |
| 13-9 | —C₄H₉(n) | 6-Br | 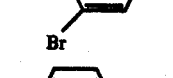 (CH₃, NO₂) | 508 | bluish red |
| 13-10 | —CH₃ | 6-Br | 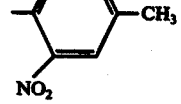 (C₂H₄OH) | 498 | red |
| 13-11 | —CH₃ | 5-Cl |  (CF₃) | 493 | scarlet |
| 13-12 | —CH₃ | 6-NO₂ | 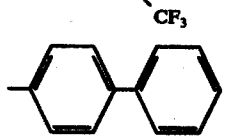 (biphenyl) | 513 | bordeaux |
| 13-13 | —CH₃ | 5-Cl | 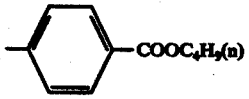 (COOC₄H₉(n)) | 499 | red |
| 13-14 | —CH₃ | 6-Br | 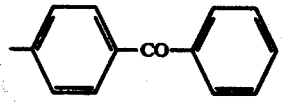 (CO) | 500 | " |
| 13-15 | —CH₃ | 6-NO₂ | 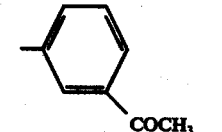 (COCH₃) | 496 | scarlet |
| 13-16 | —CH₃ | 6-Br | 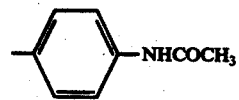 (NHCOCH₃) | 500 | red |
| 13-17 | —CH₃ | 6-Cl | 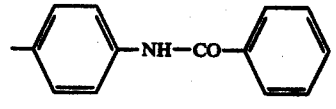 (NH—CO) | 500 | " |
| 13-18 | —C₂H₅ | Br | 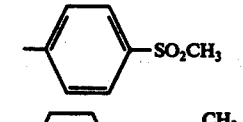 (SO₂CH₃) | 499 | " |
| 13-19 | —CH₃ | 6-NO₂ | 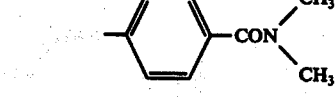 (CON(CH₃)₂) | 500 | red |

TABLE III-continued

| | Coupler | | diazonium salt | | |
|---|---|---|---|---|---|
| No. | $R^1$ | $X_n$ | A | $\lambda_{max}$ | Color of polyester fiber dyed |
| 13-20 | $-C_4H_9(n)$ | Br | 4-CON($C_2H_5$)($C_2H_5$)-phenyl | 500 | " |
| 13-21 | $-CH_3$ | $Br_2$ | 2-CN, 4-$NO_2$-phenyl | 503 | bluish red |
| 13-22 | $-CH_3$ | 6-Br | 2-Cl, 4-$NO_2$-phenyl | 508 | pink |
| 13-23 | $-CH_3$ | $Br_2$ | 2-$NO_2$, 4-Cl-phenyl | 502 | bluish red |
| 13-24 | $-C_2H_5$ | 6-$NO_2$ | 2-$CH_3$, 4-$NO_2$-phenyl | 503 | " |
| 13-25 | $-CH_3$ | 5-Cl | 2-$OCH_3$, 4-$NO_2$-phenyl | 518 | bluish red |
| 13-26 | $-CH_3$ | 6-$NO_2$ | 2-$NO_2$, 4-$OCH_3$-phenyl | 526 | reddish violet |
| 13-27 | $-CH_3$ | Br | 2-CN, 4-CN-phenyl | 516 | bluish red |
| 13-28 | $-CH_3$ | 6-Br | 2,4-di-Cl-phenyl | 496 | scarlet |
| 13-29 | $-C_2H_5$ | 5-Cl | 2-$CH_3$, 3-Cl-phenyl | 496 | " |
| 13-30 | $-CH_3$ | 6-$NO_2$ | 2-Cl, 4-$CF_3$-phenyl | 495 | " |

TABLE III-continued
| | Coupler | | diazonium salt | | |
|---|---|---|---|---|---|
| No. | R¹ | $X_n$ | A | $\lambda_{max}$ | Color of polyester fiber dyed |
| 13-31 | —CH₃ | 6-Cl |  | 507 | pink |
| 13-32 | —CH₃ | Br | 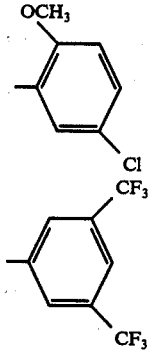 | 496 | scarlet |
| 13-33 | —CH₃ | Br | 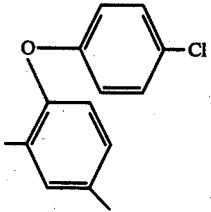 | 500 | red |
| 13-34 | —CH₃ | 6-Br | 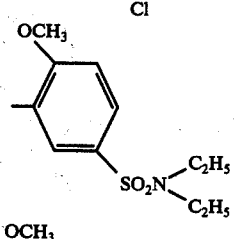 | 496 | scarlet |
| 13-35 | —C₄H₉(n) | 6-NO₂ | 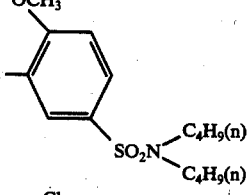 | 497 | " |
| 13-36 | —CH₃ | 5-Cl | 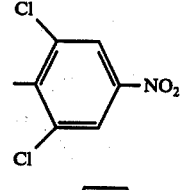 | 503 | bluish red |
| 13-37 | —C₂H₄COCH₃ | 6-Cl | 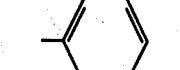 | 500 | clear scarlet |
| 13-38 | —C₂H₄OH | 5-Cl | 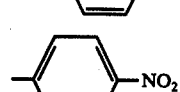 | 502 | bluish red |
| 13-39 | —C₂H₄OH | 6-Br | 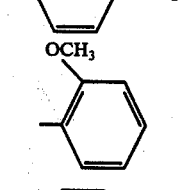 | 510 | pink |
| 13-40 | —C₂H₄OC₂H₅ | Br₂ | 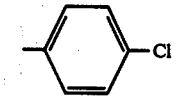 | 501 | orange red |

TABLE III-continued

| | Coupler | | diazonium salt | | |
|---|---|---|---|---|---|
| No. | R[1] | $X_n$ | A | $\lambda_{max}$ | Color of polyester fiber dyed |
| 13-41 | —C₂H₄CN | 6-NO₂ | 2-Cl phenyl | 496 | clear orange red |
| 13-42 | —C₂H₄Cl | (NO₂)₂ | phenyl | 501 | scarlet |
| 13-43 | —CH₂COOH | Br₂ | phenyl | 500 | " |
| 13-44 | —CH₂COOCH₃ | 6-Br | 4-NO₂ phenyl | 504 | bluish red |
| 13-45 | —C₃H₆OCH₃ | 5-Cl | phenyl | 499 | clear scarlet |
| 13-46 | —C₃H₆OCH₃ | 6-Br | 2-CN-4-NO₂ phenyl | 503 | bluish red |
| 13-47 | —C₃H₆OCH₃ | 6-Cl | 2-CH₃-4-NO₂ phenyl | 503 | " |
| 13-48 | —C₃H₆OCH₃ | 5-Cl | 2-Br-4,6-(NO₂)₂ phenyl | 504 | " |
| 13-49 | C₃H₆OCH₃ | 6-Br | 2,6-Cl₂-4-NO₂ phenyl | 503 | bluish red |
| 13-50 | —C₃H₆OCH(CH₃)₂ | 6-Cl | 4-NO₂ phenyl | 503 | bluish red |
| 13-51 | —C₂H₄N(C₂H₅)₂ | 6-NO₂ | 3-Cl phenyl | 496 | orange red |
| 13-52 | —CH(CH₂CH₂)₂CH₂ (cyclopentyl) | 6-Br | 4-NO₂ phenyl | 503 | red |
| 13-53 | —CH₂CH₂CH₂N(CH₂CH₂)₂O (morpholino) | 6-Br | phenyl | 500 | scarlet |

TABLE III-continued

| | Coupler | | diazonium salt | | |
|---|---|---|---|---|---|
| No. | R¹ | $X_n$ | A | $\lambda_{max}$ | Color of polyester fiber dyed |
| 13-54 | —CH₂—C₆H₄—NO₂ (m) | 5-Cl | —C₆H₄—Cl (p) | 501 | " |
| 13-55 | (3-methylphenyl) | 6-Br | C₆H₅— | 500 | orange red |
| 13-56 | 2,5-dimethylphenyl | 5-Cl | —C₆H₄—NO₂ (p) | 499 | scarlet |
| 13-57 | 4-N(CH₃)₂—C₆H₄— | 5-Cl | —C₆H₄—COCH₃ (p) | 500 | red |
| 13-58 | —CH₂CH₂—C₆H₅ | [NO₂]₂ | —C₆H₄—Cl (p) | 501 | scarlet |
| 13-59 | 4-CH₃—C₆H₄— | 6-Br | C₆H₅— | 500 | orange red |
| 13-60 | —C₂H₄NHC₂H₅ | 6-Br | —C₆H₄—Cl (m) | 497 | " |
| 13-61 | —C₂H₄NHC₂H₄OH | 6-Br | C₆H₅— | 496 | " |
| 13-62 | —C₂H₄NHCH(CH₂)OH | 6-Cl | —C₆H₄—NO₂ (p) | 503 | bluish red |
| 13-63 | —CH₃ | 5-Cl | 2-OC₂H₅—C₆H₄— | 504 | pink |

EXAMPLE 14

A solution of a diazonium salt prepared by diazotizing 12.8 g. of m-chloroaniline was added dropwise to a solution of 33.3 g. of a hydroxynaphthalic acid derivative having the formula:

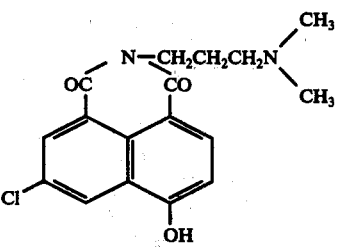

4 g. of sodium hydroxide and 10.6 g. of sodium carbonate in 300 ml. of water at 0°–5° C. After coupling the reactants, the precipitated crystals were filtered, washed with water and dried to yield the azo dye. The azo dye was dissolved in chlorobenzene and 15 g. of dimethylsulfate was added to it and reacted at 80° C. for 5 hours. The precipitated crystals were filtered, washed with benzene and dried to yield 30 g. of an azo dye with the following formula:

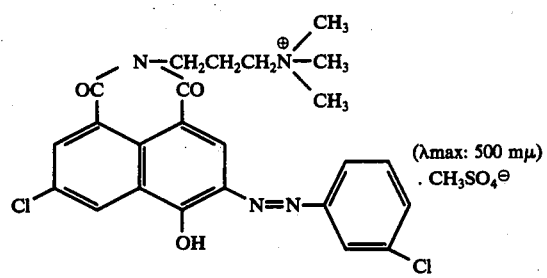

(λmax: 500 mμ) . CH₃SO₄⁻

The same azo dye was also prepared by the following process. A solution of a diazonium salt prepared by diazotizing 12.8 g. of m-chloroaniline, was added dropwise to a solution of 45.9 g. of a 4-hydroxynaphthalic acid derivative having the formula:

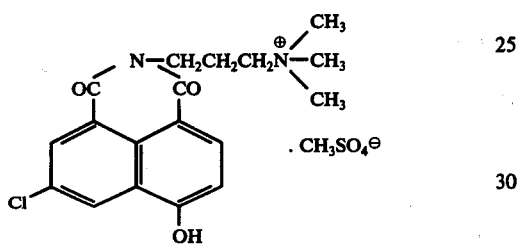

. CH₃SO₄⁻ in 100 ml. of water at 0°–5° C. A 10% sodium carbonate solution was simultaneously added to maintain neutral or weakly alkaline reaction conditions. After coupling the reactants, the precipitated crystals were filtered and dried to yield the dye.

EXAMPLE 15

In accordance with the process of Example 14, diazonium salts of aromatic amines containing aryl groups labeled as

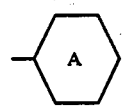

in Table IV were reacted separately with solutions each of which contained a 4-hydroxynaphthalic acid derivative to yield azo dyes. Each hydroxynaphthalic acid derivative is characterized by $R^1$ substitution, $X_n$ substitution and a counter anion as shown in Table IV.

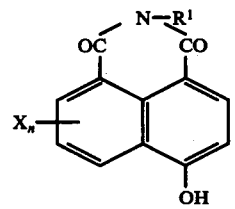

The color of polyacrylonitrile fibers dyed with each azo dye is shown in Table IV.

TABLE IV

| No. | $R^1$ | Coupler anion | Diazonium salt $X_n$ | ⟨A⟩ | $\lambda_{max}$ | Color of polyacrylonitrile fiber dyed |
|---|---|---|---|---|---|---|
| 15-1 | —CH₂CH₂CH₂N⁺(CH₃)(CH₃)CH₃ | [CH₂SO₄⁻] | 6-Br | phenyl | 500 | scarlet |
| 15-2 | —CH₂CH₂CH₂N⁺(C₂H₅)(CH₃)CH₃ | [C₂H₅SO₄⁻] | 6-NO₂ | m-Cl-phenyl | 496 | " |
| 15-3 | —CH₂CH₂CH₂N⁺(C₂H₅)(morpholino) | [C₂H₅SO₄⁻] | 6-NO₂ | p-Cl-phenyl | 501 | " |
| 15-4 | —CH₂CH₂N⁺(CH₃)(C₂H₅)C₂H₅ | [CH₃SO₄⁻] | Br₂ | p-NO₂-phenyl | 503 | red |
| 15-5 | —CH₂CH₂—N⁺(pyridinium) | [Cl⁻] | 6-Cl | o-OCH₃-phenyl | 510 | red |
| 15-6 | —CH₂CH₂CH₂—N⁺(CH₃)(CH₃)CH₃ | [Cl⁻] | 6-Br | 3-OCH₃-4-NO₂-phenyl | 519 | bluish-red |

TABLE IV-continued

| No. | R[1] | Coupler anion | Diazonium salt X_n | -A (ring) | λ_max | Color of polyacrylonitrile fiber dyed |
|---|---|---|---|---|---|---|
| 15-7 | $-CH_2CH_2CH_2\overset{\oplus}{N}(CH_3)_3$ | [Cl⊖] | 5-Cl | -C_6H_4-COCH_3 | 500 | red |
| 15-8 | $-CH_2CH_2CH_2\overset{\oplus}{N}(CH_3)_3$ | [Cl⊖] | Br | -C_6H_4-COCH_3 | 500 | " |
| 15-9 | $-CH_2CH_2\overset{\oplus}{N}(CH_3)_2(NH_2)$ | [Cl⊖] | 6-Cl | 2-OCH_3, 4-NO_2-C_6H_3- | 500 | " |

The following comparative data is presented to show the superior light fastness properties of the dyes of the present invention over the azo dyes of Fuchs et al, U.S. Pat. No. 2,961,438. In the comparative tests, fabric samples woven from polyethyleneterephthalate crimped yarns were dyed with the dyes of samples 1-18 of the present invention and dye samples 19-29 of the prior art. Each sample of fabric was subjected to a dye bath containing 0.5% o.w.f. of dye sample, 1.0 g/l of the condensation product of naphthalene sulfonic acid and formaldehyde and a buffer solution of 0.2 g/l of Na$_2$SO$_4$ and 0.03 g/l of acetic acid. Each fabric sample was dyed in a dyeing apparatus (Colourpet Type 12, maufactured by Nippon Dyeing Machine Mfg. Co., Ltd.) at 130° C for 60 minutes at a ratio of fabric to dye bath of 1:30. The fabric samples were then washed in a solution of 2 g/l each of hydrosulfite, sodium hydroxide and a nonionic surfactant at 80° C for 10 minutes. Table V below shows the dyes of the present invention (Samples 1-18) and the dyes of the prior art (Samples 19-29) used in the dyeing tests.

TABLE V

| Sample No. Our Invention | Sample No. Reference | Our Invention X | Our Invention R | Reference D |
|---|---|---|---|---|
| 1 | 19 | —H | —H | —C_6H_5 |
| 2 | 20 | —H | —CH_3 | —C_6H_5 |
| 3 | 21 | —H | —C_3H_6OCH_3 | —C_6H_5 |
| 4 | 22 | —H | —C_3H_6OCH_3 | —C_6H_4-Cl |
| 5 | — | —H | CH_3 | —C_6H_4-NO_2 |
| 6 | 23 | —H | —C_3H_6OCH_3 | —C_6H_4-NO_2 (meta) |
| 7 | — | —H | —CH_3 | —C_6H_4-CH_3 (meta) |

TABLE V-continued

| | | Structure | | |
|---|---|---|---|---|
| | | Our Invention | | Reference |

Our Invention structure: naphthalene with N-R bridge (OC-NR-CO), X substituent, OH, and N=N-D group.

Reference structure: naphthalene with N-R bridge (OC-NR-CO), OH, and N=N-D group.

| Sample No. Our Invention | Sample No. Reference | X | R | D |
|---|---|---|---|---|
| 8 | 24 | —H | —C$_3$H$_6$OCH$_3$ | —C$_6$H$_4$—CH$_3$ |
| 9 | 25 | —H | —CH$_3$ | —C$_6$H$_4$—COOC$_2$H$_5$ |
| 10 | 26 | —H | —C$_3$H$_6$OCH$_3$ | —C$_6$H$_4$—NO$_2$ |
| 11 | — | —H | —CH$_3$ | —C$_6$H$_3$(NO$_2$)$_2$ |
| 12 | 27 | —H | —C$_3$H$_6$OCH$_3$ | —C$_6$H$_3$(NO$_2$)$_2$ |
| 13 | 28 | H | —C$_3$H$_6$OCH$_3$ | —C$_6$H$_3$(NO$_2$)(CH$_3$) |
| 14 | 29 | H | —C$_3$H$_6$OCH$_3$ | —C$_6$H$_3$(Cl)(NO$_2$) |
| 15 | — | Cl | —CH$_3$ | —C$_6$H$_5$ |
| 16 | — | Br | —C$_2$H$_5$ | —C$_6$H$_4$—Cl |
| 17 | — | NO$_2$ | —CH$_3$ | —C$_6$H$_4$—Cl |
| 18 | — | Br | —CH$_3$ | —C$_6$H$_4$—NO$_2$ |

Light fastness test

The light-fastnesses of each of the dyed samples was tested with a Fade meter manufactured by Atlas Co., according to the procedure of Japanese Industrial Standard L 0842 (1971), "Testing Method for Color Fastness to Carbon Arc Lamp Light." Each fabric sample was exposed to irradiation from a carbon arc lamp at four different time periods of 10, 20, 40 and 60 hours. The standard scale for the test results is shown below:

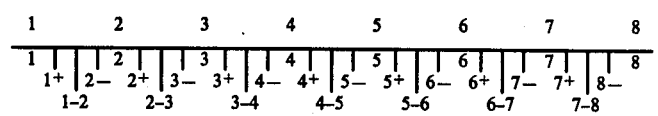

As is clear from the data is Table VI below, the dyes of the present invention show superior light-fastness, e.g., values of 4–5+, compared to the compounds of the prior art. It is important to realize that the distinction between light fastness values 4 and above as opposed to those of below 4 is critical because this point marks the dividing point between those dyes which are practically useful and those dyes which are of little practical utility.

TABLE VI

| Our Invention | | Reference | |
|---|---|---|---|
| Sample No. | Light-fastness | Sample No. | Light-fastness |
| 1 | 4 – 5 | 19 | 1 |
| 2 | 4 – 5+ | 20 | 1 |

TABLE VI-continued

| Our Invention | | Reference | |
|---|---|---|---|
| Sample No. | Light-fastness | Sample No. | Light-fastness |
| 3 | 4 – 5 | 21 | <1 |
| 4 | 4 – 5 | 22 | 1 |
| 5 | 5 | | |
| 6 | 5 | 23 | 3+ |
| 7 | 5 | | |
| 8 | 4 | 24 | <1 |
| 9 | 5 | 25 | 3 |
| 10 | 5– | 26 | <1 |
| 11 | 5 | | |
| 12 | 4 – 5 | 27 | 2 |
| 13 | 4 – 5 | 28 | <1 |
| 14 | 4 | 29 | 1 |
| 15 | 5– | | |
| 16 | 4+ | | |
| 17 | 5 | | |
| 18 | 5 | | |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An azo dye having the formula (1):

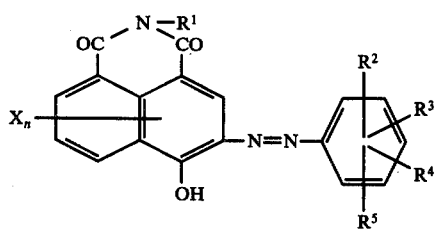

wherein $R^1$ represents hydrogen, methyl, ethyl, propyl, butyl, β-hydroxyethyl, $(C_1-C_3)$alkoxy$(C_2-C_3)$alkyl, methoxycarbonylmethyl, acetylethyl, hydroxyethylaminoethyl, cyanoethyl, N,N-di$(C_1-C_2)$alkylamino$(C_2-C_3)$alkyl, ethylaminoethyl, chloroethyl, carboxymethyl, morpholinopropyl, cyclohexyl, phenethyl, benzyl, phenyl, chlorophenyl, methoxyphenyl, nitrophenyl, tolyl, xylyl, dimethylaminophenyl, and $(C_1-C_3)$alkyl containing an ammonium group wherein the ammonium nitrogen is quaternized by $(C_1-C_3)$alkyl groups or by an amino group in combination with alkyl groups, or wherein the ammonium nitrogen is the heterocyclic nitrogen atom of a morpholine ring or a pyridine ring, the ammonium group accompanied by an anion;

wherein $R^2$ is hydrogen, chlorine, bromine, nitro, cyano, carboxyl, methyl, trifluoromethyl, phenyl, β-hydroxylethyl, $(C_1-C_2)$alkoxy, $(C_1C_2$ and $C_4)$alkoxycarbonyl, acetyl, benzoyl, acetylamino, benzoylamino, $(C_1-C_2)$alkylsulfonyl, phenylsulfonyl, di$(C_1-C_2)$alkylcarbamoyl, chlorophenoxy, dimethylaminosulfonyl, diethylaminosulfonyl, dibutylaminosulfonyl, or aminocarbonyl; $R^3$ is hydrogen, cyano, nitro, chlorine, bromine, methoxy or trifluoromethyl; $R^4$ is hydrogen, chlorine or nitro; and $R^5$ is hydrogen; and wherein, when $n = 1$, X is chlorine, bromine and nitro; when $n = 2$, X is bromine or nitro and $n$ has a value from 0-2.

2. The azo dye of claim 1, which has the formula:

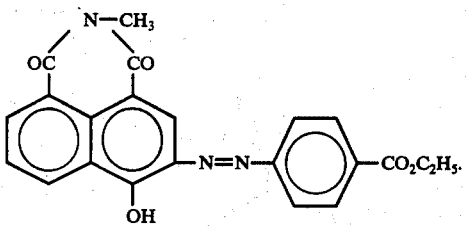

3. The azo dye of claim 1, which has the formula:

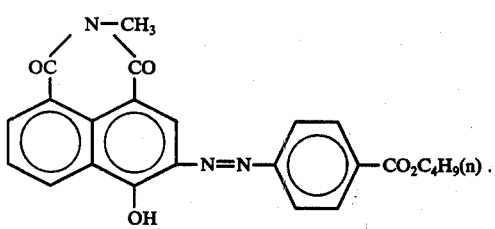

4. The azo dye of claim 1, which has the formula:

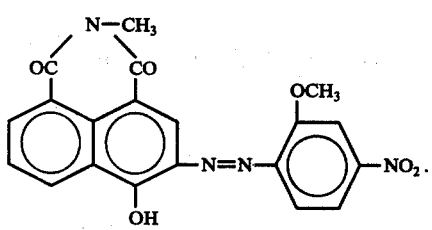

5. The azo dye of claim 1, which has the formula:

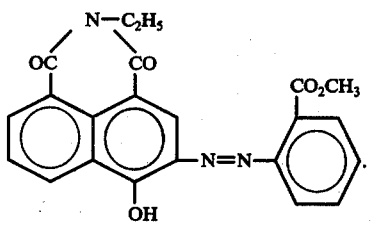

6. The azo dye of claim 1, which has the formula:

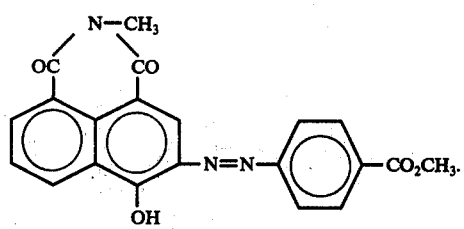

7. The azo dye of claim 1, which has the formula:

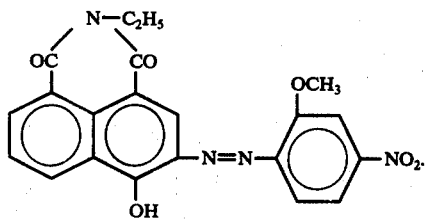

8. The azo dye of claim 1, which has the formula:

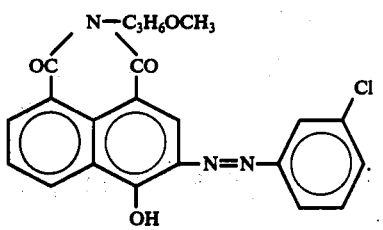

9. The azo dye of claim 1, which has the formula:

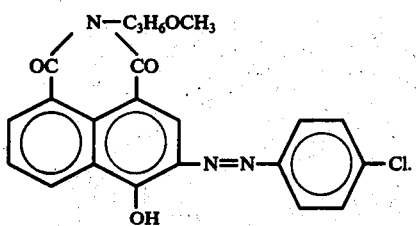

10. The azo dye of claim 1, which has the formula:

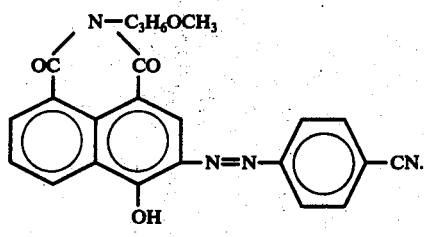

11. The azo dye of claim 1, which has the formula:

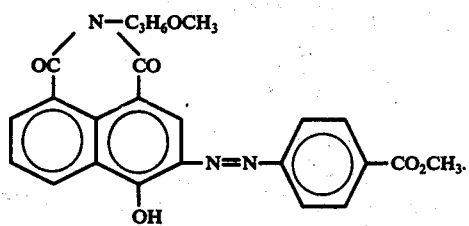

12. The azo dye of claim 1, which has the formula:

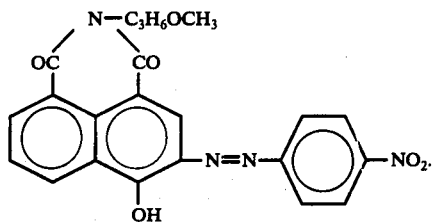

13. The azo dye of claim 1, which has the formula:

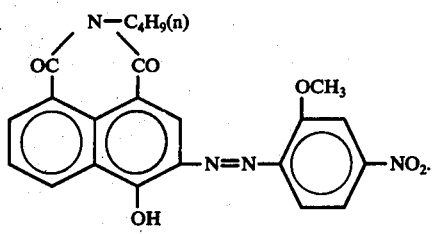

14. The azo dye of claim 1, which has the formula:

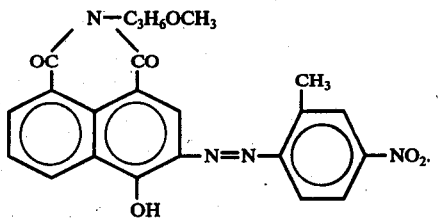

15. The azo dye of claim 1, which has the formula:

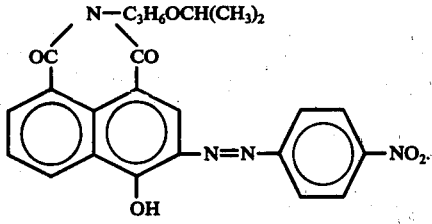

16. The azo dye of claim 1, which has the formula:

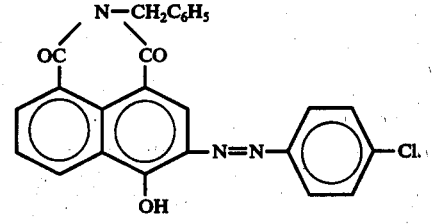

* * * * *